ALEX UHIMCHUK
PAUL A. BURGO
INVENTORS

United States Patent Office 3,585,096
Patented June 15, 1971

3,585,096
ULTRASONIC WELDING APPARATUS
Alex Uhimchuk and Paul A. Burgo, Rochester, N.Y., assignors to Eastman Kodak Company, Rochester, N.Y.
Filed May 12, 1969, Ser. No. 823,702
Int. Cl. B29c 27/08; B32b 31/16; B30b 1/32
U.S. Cl. 156—580
11 Claims

ABSTRACT OF THE DISCLOSURE

Apparatus for ultrasonically welding a plastic top on a plastic box wherein the box rotates with a turntable while an ultrasonic horn is guided around the periphery by a rotating cam. An automatic control system provides for clamping the box, starting and stopping rotation, turning the ultrasonic horn on and off selectively, and expelling the box upon completion of the welding operation.

BACKGROUND OF THE INVENTION

Field of the invention

The present invention relates to a novel apparatus for ultrasonically welding a top or cover onto the bottom portion of a box such as a cassette for holding a roll of photographic paper.

Description of the prior art

The ultrasonic joining or welding of two thermoplastic parts together has been known for some time, as described in Bodine Patent 3,022,814 and Soloff et al. Patent 3,224,916. Many other patents have been granted in this field, most of which relate to the ultrasonic welding of two thin flexible sheets of thermoplastic material. However, we are not aware of any patents describing an automatic welding machine for peripherally uniting the top and bottom sections of a box-like cassette.

SUMMARY OF THE INVENTION

We have now provided a novel apparatus for ultrasonically welding along an annular path on an object, such as the periphery of a box, for uniting the top and bottom of the box together. Generally both top and bottom are formed of thermoplastic resins, but either or both can be non thermoplastic materials as long as a thermoplastic material is present at the joint, e.g., as one of the parts, or as a gasket or coating on one or both parts. Our apparatus comprises a turntable, a motor for rotating the turntable on an axis, and clamping mechanism for holding the object to be welded on the turntable approximately centered over the axis of rotation. For actually conducting the welding operation, an ultrasonic horn is mounted for universal movement in three planes mutually perpendicular to one another and is adapted to be moved into and out of engagement with the object to be welded on the annular path. The horn is guided automatically along the annular irregular path on the object to be welded by a cam having approximately the shape of the annular path, and mounted for rotation concurrently with the turntable. A cam follower mechanism is connected to the ultrasonic horn and engages the cam so as to be moved thereby as the cam rotates.

Sometimes it is desirable to intermittently weld along the path, and this is accomplished by providing the cam with a configuration, including at least one peak, which lifts the cam follower and the horn away from the welding path momentarily, and then drops the horn back onto the path to resume the welding operation.

A fully automatic control system is provided, such that the operator simply positions the cassette to be welded on the turntable, then closes an electrical circuit, whereupon the entire operation is carried from beginning to end, at which point mechanism is actuated to expel the cassette from the turntable. The control system is provided with means for preventing energization of the ultrasonic horn, except when a cassette is in position to be welded. This not only saves electricity, but extends the life of the ultrasonic horn and its actuating transducer.

DESCRIPTION OF THE DRAWINGS

The invention will be described in greater detail below with reference to the accompanying drawings, wherein.

DESCRIPTION OF THE PREFERRED EMBODIMENT

Figure 1:
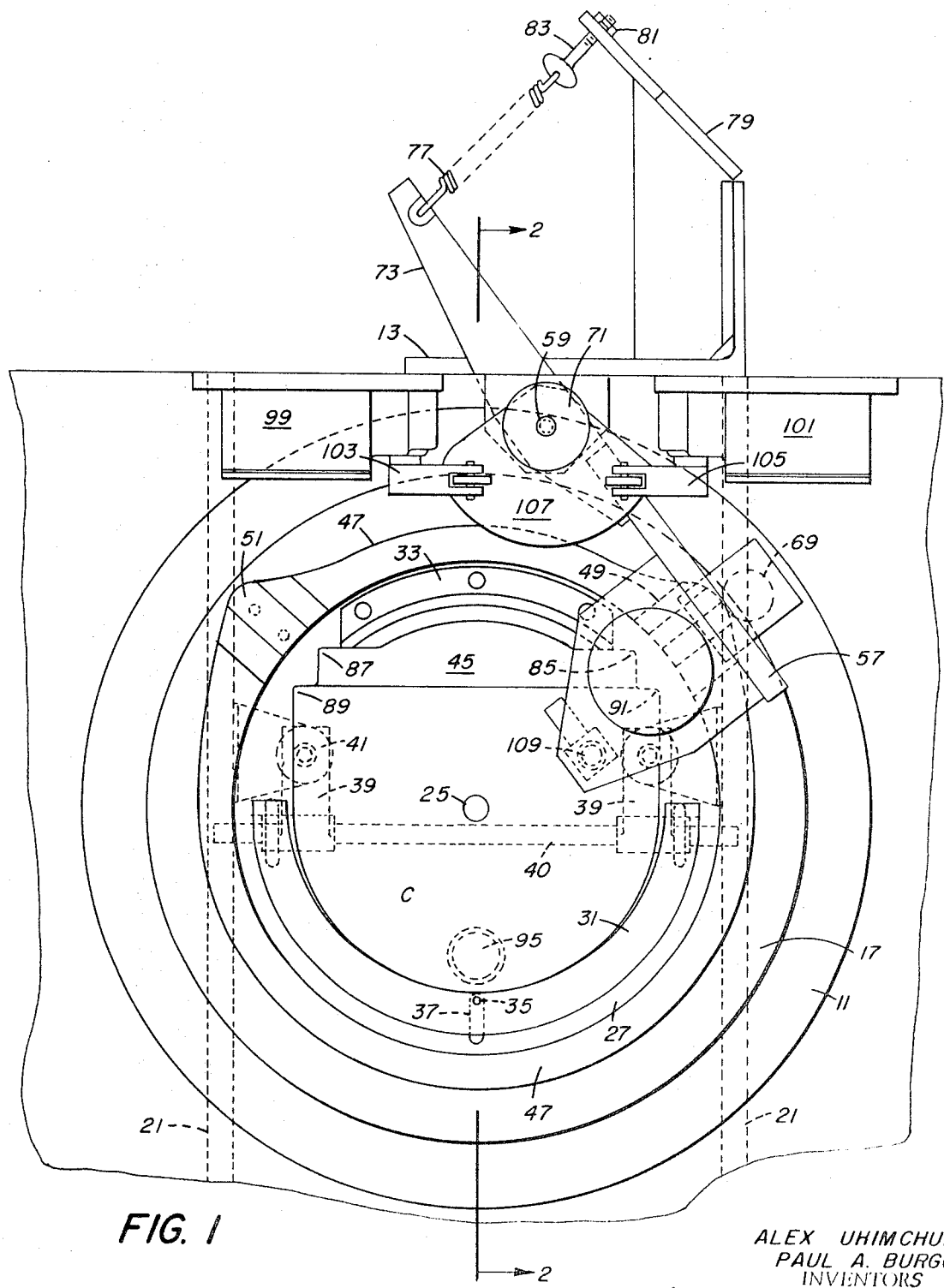
FIG. 1 is a plan view of the ultrasonic welding apparatus of the invention.
Figure 2:
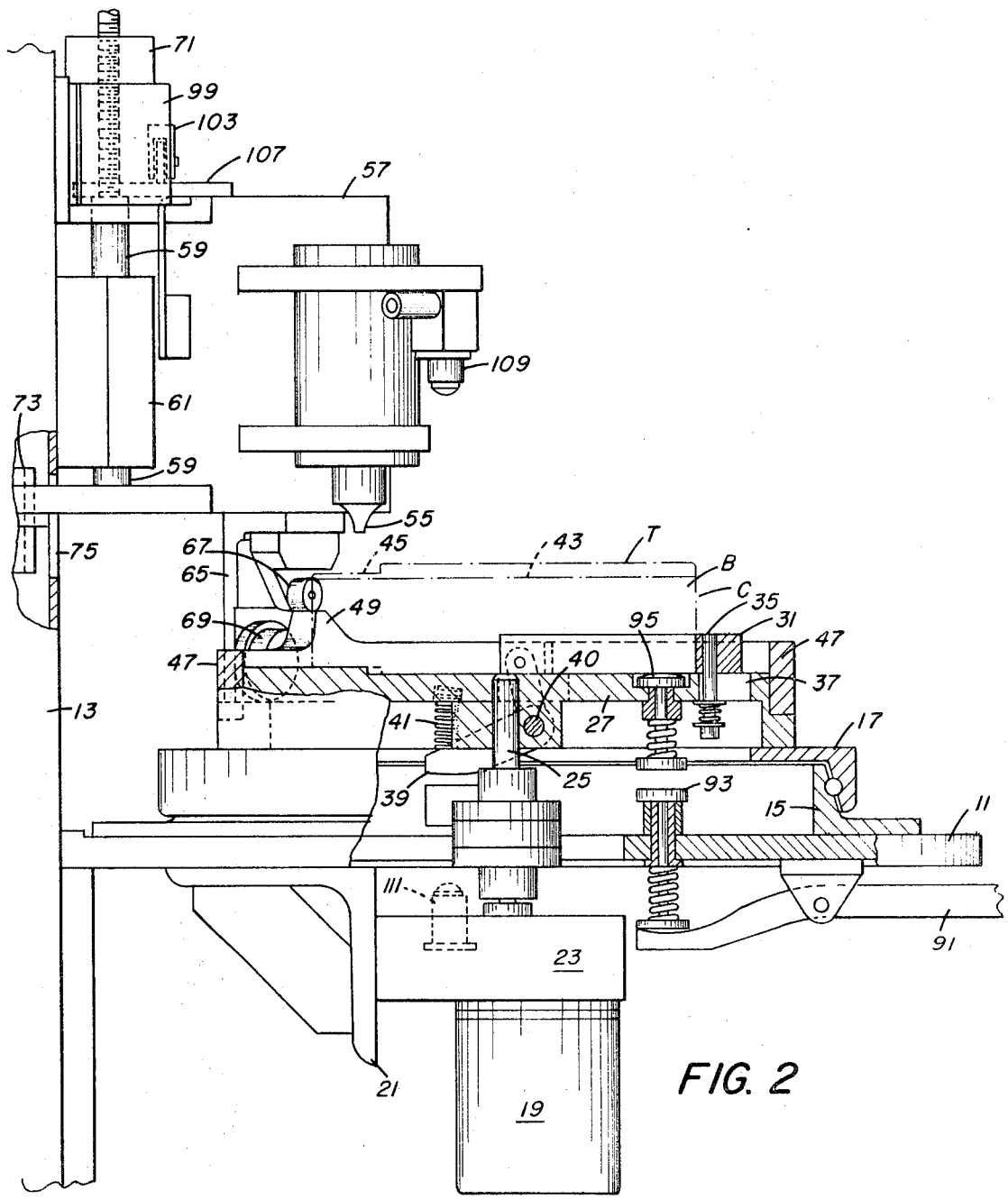
FIG. 2 is a cross sectional view taken along the line 2—2 in FIG. 1, with parts being shown in elevation.

Referring to FIGS. 1 and 2, there is shown a horizontal support table 11 projecting as a bracket from a vertical column 13 and having an annular upstanding boss 15 over which an annular turntable 17 is journalled in ball bearings for rotation relative to the boss 15.

An electric motor 19 is mounted by a bracket 21 on the bottom of support table 11, and is connected through a gear reduction unit 23 to a vertical shaft 25 which is mounted centrally in a bore in a bedplate 27 constituting an integral part of the turntable, so that when the motor 19 is actuated, the whole turntable, including the bedplate, rotates on the axis of the shaft 25.

A cassette C having the shape shown in FIG. 1 is positioned on the bedplate 27, and is held in position approximately centered thereon by an arcuate clamp 31 which presses the cassette against an arcuate abutment plate 33 secured on the opposite side of bedplate 27. Clamp 31 is mounted on the bedplate for movement back and forth, and is provided with a vertical guide pin 35 which slides within a slot 37 in the bedplate. Each end of the clamp 31 is connected by a bellcrank lever mechanism 39 (on opposite ends of a horizontal shaft 40) to a spring 41 which is held at one end within a bore in bedplate 27, and at the other end within a bore in the end portion of the bellcrank. Spring pressure is exerted downwardly against each bellcrank and normally causes the clamp 31 to be held in the inward or clamping position as shown in FIG. 2.

The operator positions the cassette C by first placing the edge of the cassette against the clamp 31, and pushing it outwardly to the right in FIG. 2, at which point the other edge of the cassette can be dropped into position adjacent to abutment plate 33. Thereafter, when the operator releases the pressure, the clamp 31 moves inwardly to the left in FIG. 2, and holds the cassette firmly in position.

Referring to FIG. 2, it will be seen that the cassette C comprises a top T and a bottom B which are to be welded together along a joint 43. Most of top T is of a relatively great thickness, but a portion near one end is stepped down and is of less thickness than the rest of the top, as shown at 45, thus making it necessary to step down the ultrasonic horn and to step it up again as it passes on and off the step 45. This will be done in a manner to be described more in detail hereinafter.

An annular cam ring 47 having a circular inner periphery is mounted in a circular step in the bedplate 27 around the periphery thereof and centered around shaft 25, so as to be rotatable as a unit therewith. Cam 47 has its outer periphery generally the same irregular shape as the peripheral path to be welded on the cassette C.

For lifting the sonic horn 55 off the cassette C and then returning it to the cassette at selected positions when intermittent welding is desired, the cam 47 is provided with two annularly spaced peaks or lobes 49 and 51 whose function will be described more in detail hereinafter.

The actual welding of the top T and bottom B of the cassette C together is accomplished by an ultrasonic horn 55 which is clamped onto a bracket or arm 57 which in turn is mounted on a vertical shaft 59. Shaft 59 is mounted for movement upwardly and downwardly, and also pivotally, within a split bearing 61 carried on the support column 13. Thus, the horn 55 is mounted for universal movement freely in a horizontal plane and at the same time can move vertically up or down as required by the welding operation.

For guiding the horn 55 along the peripheral path on cassette C, a bracket 65 projects down from the bracket or arm 57, and is provided with a rotatable cam follower wheel 67 which is adapted to ride upon the horizontal top surface of the cam 47. Bracket 65 also carries a second cam follower 69 having the shape of a journalled ball (ball caster) which is positioned to ride on the outside surface of cam 47 as the cam rotates.

In order to assure that cam follower wheel 67 will remain in contact with the top surface of cam 47, a weight 71 is carried on the top of shaft 59. In order to assure that cam follower 69 will remain in contact with the side surface of cam 47 as the latter rotates, an outrigger lever arm 73 projects from bracket 57 away from horn 55 through a slot 75 in support column 13 which is long enough and wide enough to permit the necessary vertical and horizontal movement of the outrigger. A tensioned spring 77 is fastened to the far end of lever 73 and is connected at its opposite end to a stationary bracket 79 projecting from support 13. The amount of tension exerted by the spring can be regulated by movement of a nut 81 on a threaded rod 83.

The mode of operation of the apparatus will now be described without reference to the fully automatic control system, which will be described in detail hereinafter. The operator first places a cassette C in position between the abutment plate 33 and the arcuate clamp 31, and then closes a switch to start the operation of the motor 19 and the ultrasonic horn 55. The motor 19 rotates the turntable 17, and the cam 47 and cassette C therewith. When rotation starts, the cam follower wheel 67 descends from the cam peak 49 to a lower level which brings the horn 55 into direct contact with the corner 85 of cover T (see FIG. 1) and the welding of cover T to box B begins. Upon further rotation of cassette C in a clockwise direction, horn 55 travels along the periphery until it reaches the corner 87, welding as it goes.

The cam follower 67 then rises up on cam peak 51 to remove the horn from contact with the cassette, and then descends the other side of peak 51 until the horn comes into contact with the cassette again at the corner 89. Upon continued rotation of the cassette the horn traverses the remainder of the peripheral path until corner 91 is reached, whereupon cam follower 67 again rises onto the top of cam peak 49 and the current to the motor 19 and the horn 55 is then shut off by the operator. The operator then actuates a lever 91 to move a plunger 93 into engagement with a second plunger 95 which pushes the cassette C out of engagement with the clamp 31 so that it can be removed and replaced by a new cassette. Plunger 93 is mounted in table 11, and plunger 95 is mounted in bedplate 27 for rotation therewith so that the two plungers are only axially aligned at the beginning and end of a welding cycle.

THE AUTOMATIC CONTROL SYSTEM

Figure 3:
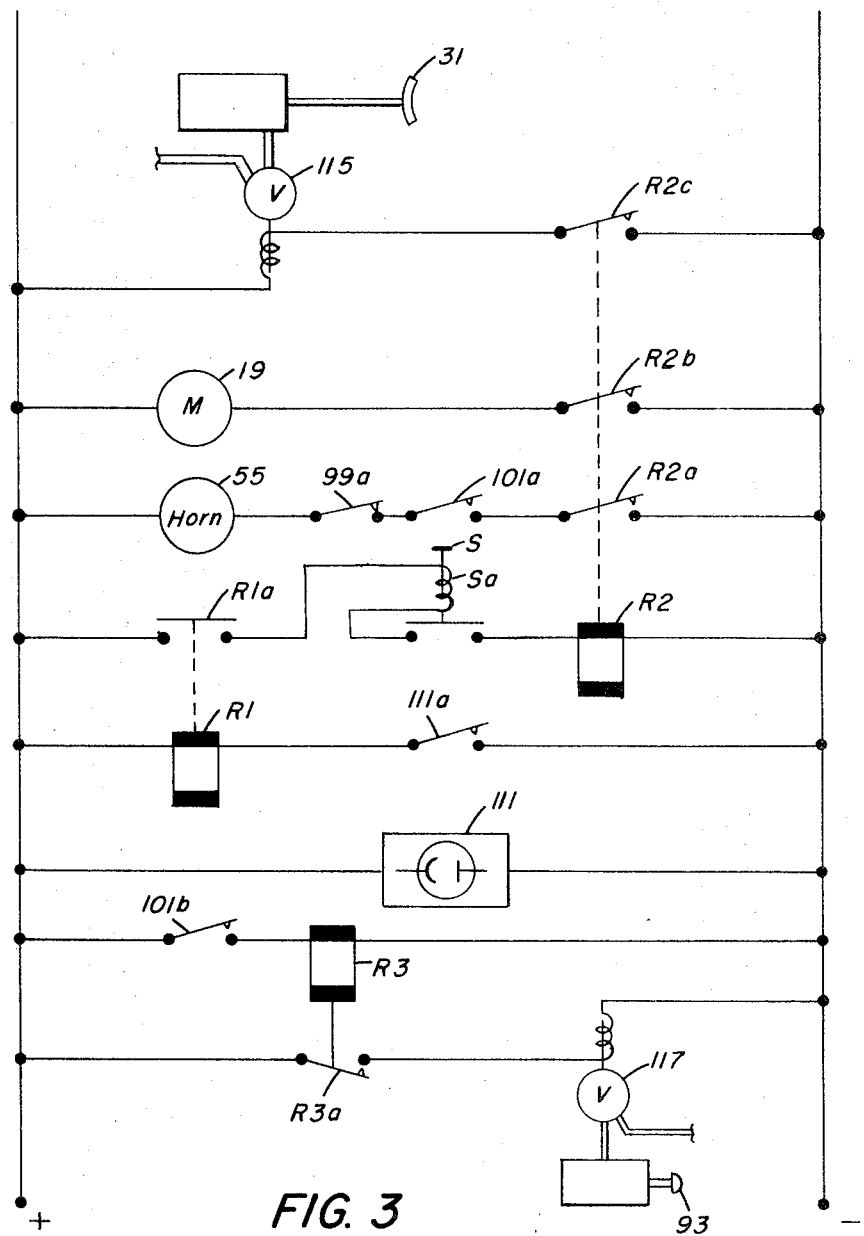
FIG. 3 is a schematic diagram of an automatic control system for controlling the operation of the apparatus of the invention.

The apparatus described above can be successfully operated with a minimum of automatic control means, as described. However, the speed and accuracy of the operation can be improved by a fully automatic control system which only requires the operator to place the cassette C in operating position and then to close a switch means in a single circuit to assure that the operation will be carried out successfully from beginning to end automatically. Such an automatic control system is shown in FIG. 3 of the drawings.

As part of the automatic control system, there are two limit switches 99 and 101 on opposite sides of the shaft 59 and carried by the support 13. The limit switches have pivoted actuator arms 103 and 105, respectively, in position to be actuated by an arcuate plate 107 which is carried on the shaft 59 so as to pivot in a horizontal plane therewith, and also to rise and fall therewith as the cam follower 67 rises onto and descends from the peaks 49 and 51.

An additional part of the automatic control system involves a light source 109 carried by bracket 57 adjacent to ultrasonic horn 55 in position for directing a light beam vertically downward through a hole (not shown), in bedplate 27 toward a photocell 111 carried by bracket 21. When a cassette C is in position to be welded, the light beam is cut off and the circuit of the ultrasonic horn is conditioned to be energized. However, when no cassette C is in position, the light beam, acting through the photocell 111, places the circuit of the ultrasonic horn in condition so that it cannot be energized until the light beam has been cut off.

With cam follower 67 on the peak of cam peak 49 as in FIG. 2, contact 101a of limit switch 101 is open, and contact 101b is closed. The operator places a cassette C in position, thus cutting off the light beam to photocell 111 which then closes switch contact 111a and energizes relay R1 to close contact R1a, placing the system in condition for operation.

The operator then closes a switch S manually to energize a solenoid holding coil Sa and a relay R2, which then closes contacts R2a, R2b and R2c. Switch contact R2c closes first, and is then followed by the simultaneous closing of time delay switch contacts R2a and R2b after a brief time interval. Closing of switch contact R2c actuates a solenoid operated fluid control valve 115 to actuate a piston and cause clamp 31 to move toward abutment plate 33.

The simultaneous closing of switch contacts R2a and R2b starts the motor 19 for rotating turntable 17, and at the same time places the circuit of the ultrasonic horn 55 in condition to be energized after a brief interval when cam follower 67 descends from the peak 49 and arcuate plate 107 closes limit switch contact 101a. When switch contact 101a closes, switch 101b opens.

The vibrating horn traverses the path to be welded from corner 85 over to the corner 87. At corner 87 the cam follower 67 rises up onto the cam peak 51, thus causing arcuate plate 107 to operate limit switch 99 to open contact 99a to deenergize the horn as movement continues from corner 45 toward corner 89. At corner 89 the cam follower 67 descends from peak 51, the horn again descends to the level of the cassette C, limit switch 99a again closes to reenergize the horn which then traverses the remainder of the periphery of the rotating cassette C until corner 91 is reached.

At this point cam follower 67 rises again to its initial position on the top of peak 49, arcuate plate 107 reopens the limit switch contact 101a, and closes associated limit switch contact 101b. Closed switch 101b energizes relay R3 which closes switch contact R3a to operate a fluid control valve 117 and actuate plunger 93 which expels the cassette from its clamped position.

When the operator removes cassette C, the photocell 111 again denergizes relay R1 by opening switch contact 111a, thus causing switch R1a to reopen and start switch S to reopen, deenergizing relay R2 and opening switch contacts R2a, b and c, placing the system in condition for the next cycle.

The invention has been described in detail with particular reference to preferred embodiments thereof, but it will be understood that variations and modifications can be effected within the spirit and scope of the invention.

We claim:

1. Apparatus for ultrasonically welding along an annular path on a top surface of an object, said apparatus comprising:
   a turntable rotatable on a stationary axis;
   first means for rotating said turntable on said stationary axis;
   second means for holding said object on said turntable approximately centered over said axis;
   an ultrasonic horn mounted for universal movement and adapted to engage said object on said annular path on the top surface thereof and to move relatively along said path as said object rotates;
   a cam having approximately the shape of said annular path, said cam being mounted for rotation concurrently with said turntable;
   cam follower means engaging said cam and movable thereby as said cam rotates; and
   means connecting said cam follower means with said ultrasonic horn for guiding said horn along said annular path as said turntable rotates.

2. Apparatus in accordance with claim 1 wherein said cam is mounted on said turntable in position to encircle said object.

3. Apparatus in accordance with claim 2, also comprising
   a shaft parallel to the axis of rotation of said turntable and located at a position offset from said turntable;
   a support bracket carrying both said ultrasonic horn and said cam follower means, said support bracket being journalled on said shaft for rotational movement in a plane normal to said axis, and also for movement back and forth along said shaft;
   said cam having a side surface and a surface normal to said side surface;
   said cam follower means comprising a first element in contact with said side surface of said cam and a second element in contact with said surface normal to said side surface;
   said apparatus also comprising means resiliently urging said first element against said side surface.

4. Apparatus in accordance with claim 3 wherein said cam has at least one peak whereby said cam follower holds said ultrasonic horn out of contact with said object as said cam follower traverses said peak;
   said apparatus also comprising a stationary support for said turntable;
   expulsion means associated with said turntable actuatable to expel said object upon completion of a welding operation;
   actuating mechanism carried by said support and aligned with said expulsion means only at the beginning and end of a welding operation;
   clamping means for holding said object on said turntable; and
   switch actuating mechanism carried by said support bracket; said apparatus also comprising
   an automatic control system comprising first switch means for operating said clamping means and for starting rotation of said turntable sequentially;
   second switch means controlling said ultrasonic horn and actuatable in response to movement of said switch actuating mechanism to discontinue vibrations when said cam follower rises onto said peak, and to resume vibrations when said cam follower moves off of said peak;
   second switch means actuatable in response to completion of the welding operation to operate said actuating mechanism for said expulsion means, and to operate said clamping means to release said object;
   and third switch means controlling said ultrasonic horn to turn said horn on and off, said third switch means being responsive to the presence or absence of said object to permit energizing said horn when said object is in position to be welded, and to permit deenergizing said horn when no object is in position.

5. Apparatus in accordance with claim 1 wherein said cam has a cam surface provided with at least one peak whereby said cam follower holds said ultrasonic horn out of contact with said object as said cam follower traverses said peak.

6. Apparatus in accordance with claim 5, also comprising an automatic control system comprising switch means controlling said ultrasonic horn, said switch means being actuatable in response to movement of said cam follower onto said peak to discontinue vibrations, and actuatable in response to movement of said cam follower off of said peak to resume vibrations.

7. Apparatus for ultrasonically welding along an annular path on a top surface of an object, said apparatus comprising:
   a turntable rotatable on a stationary axis;
   first means for rotating said turntable on said stationary axis;
   second means for holding said object on said turntable approximately centered over said axis;
   an ultrasonic horn mounted for movement and adapted to engage said object on said annular path on the top surface thereof and to move relatively along said path as said objects rotates;
   guide mechanism for guiding said ultrasonic horn along said path; and
   means connecting said guide mechanism with said ultrasonic horn for guiding said horn along said annular path as said turntable rotates.

8. Apparatus in accordance with claim 7, also comprising expulsion means associated with said turntable actuatable to expel said object upon completion of a welding operation.

9. Apparatus in accordance with claim 8, also comprising an automatic control system comprising mechanism actuatable in response to completion of the welding operation to actuate said expulsion means.

10. Apparatus in accordance with claim 7, also comprising an automatic control system comprising
    switch means controlling said ultrasonic horn, and
    means for actuating said switch means to turn said ultrasonic horn on and off, said last named means being responsive to the presence or absence of said object to permit energizing said ultrasonic horn when said object is in position to be welded, and to permit deenergizing said ultrasonic horn when no object is in position.

11. Apparatus in accordance with claim 7, also comprising an automatic control system comprising mechanism actuatable in response to the start of a welding operation for operating said second means for holding said object on said turntable, said mechanism being actuatable again in response to the completion of a welding operation for operating said second means to release said object.

References Cited
UNITED STATES PATENTS

| | | | |
|---|---|---|---|
| 2,713,437 | 7/1955 | Broden | 156—486X |
| 3,436,006 | 4/1969 | Cole | 156—580X |

SAMUEL FEINBERG, Primary Examiner

J. J. DEVITT, Assistant Examiner

U.S. Cl. X.R.

156—73; 228—1